Sept. 25, 1951  W. A. ENDTER  2,569,042
LOCK CONTROL MECHANISM
Filed Jan. 12, 1946  3 Sheets-Sheet 1
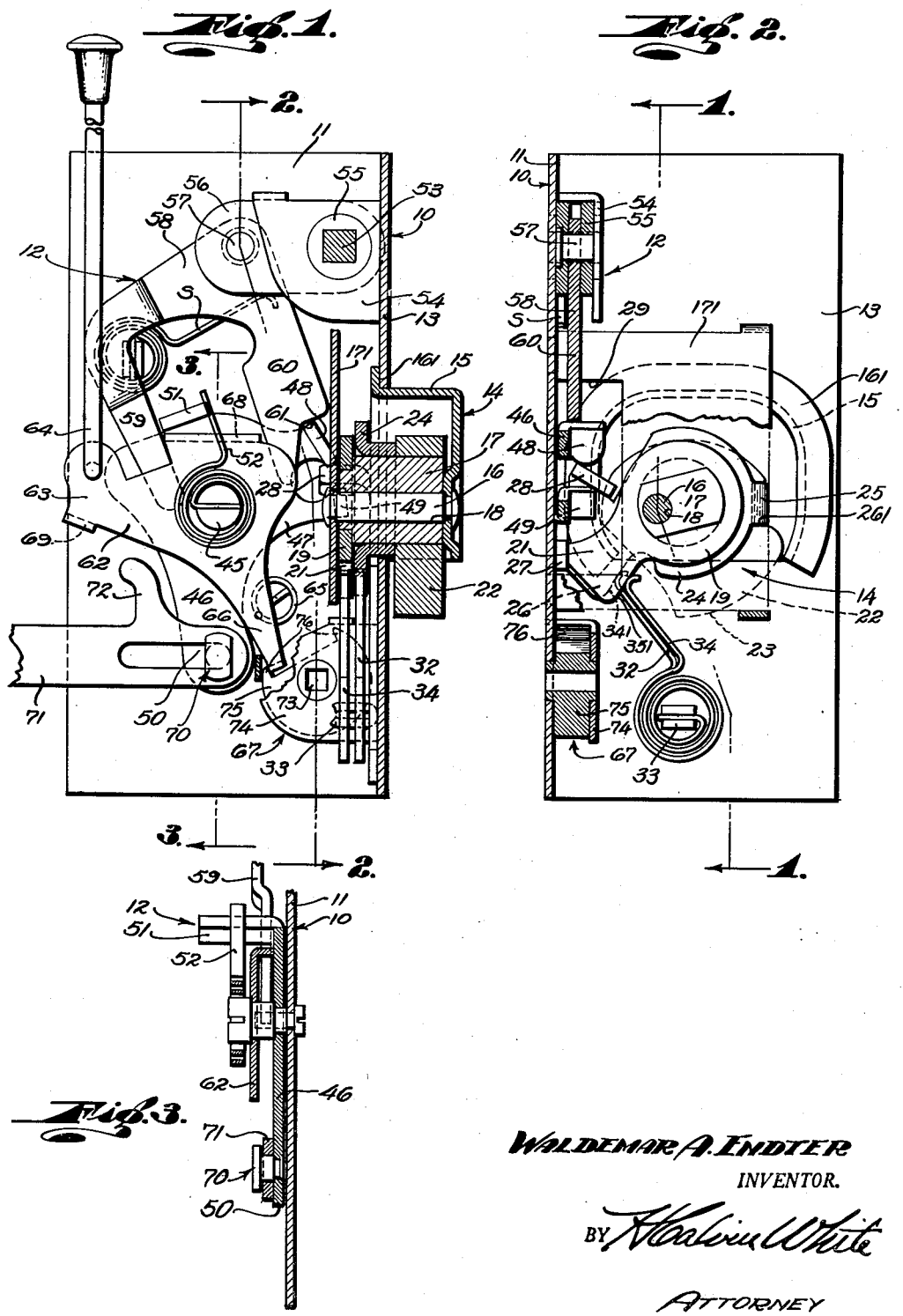
WALDEMAR A. ENDTER
INVENTOR.
BY
ATTORNEY Sept. 25, 1951  W. A. ENDTER  2,569,042
LOCK CONTROL MECHANISM
Filed Jan. 12, 1946  3 Sheets-Sheet 2
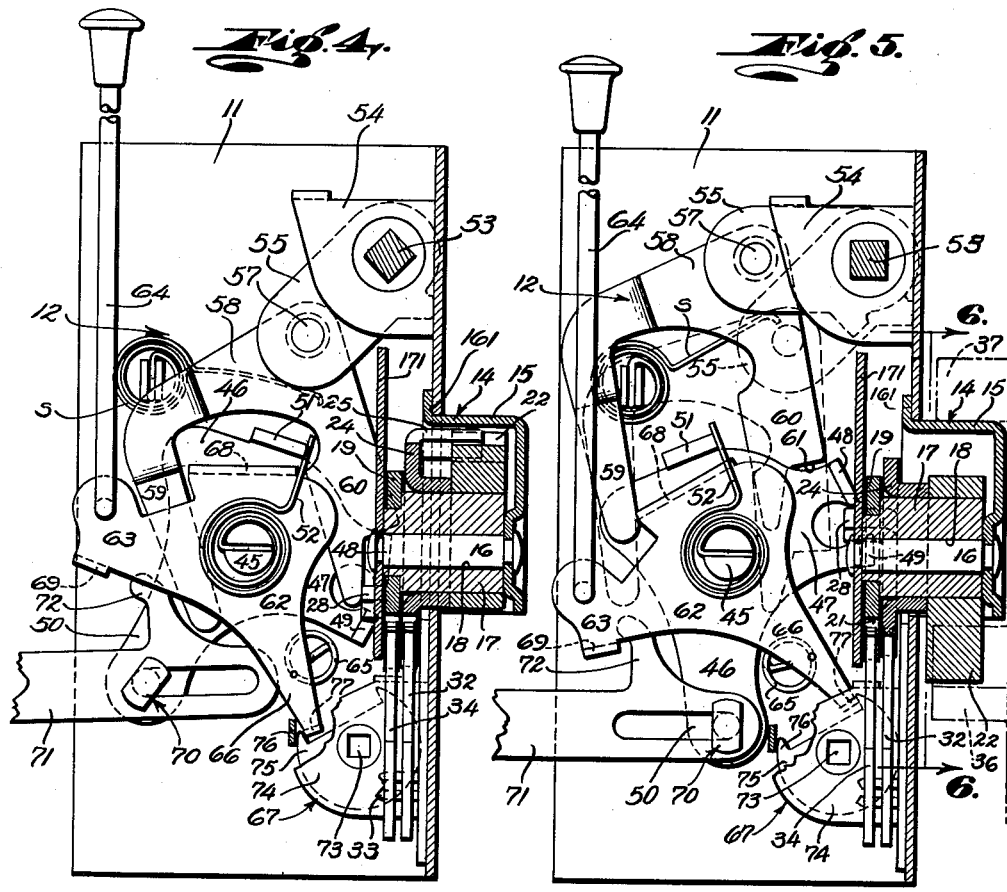
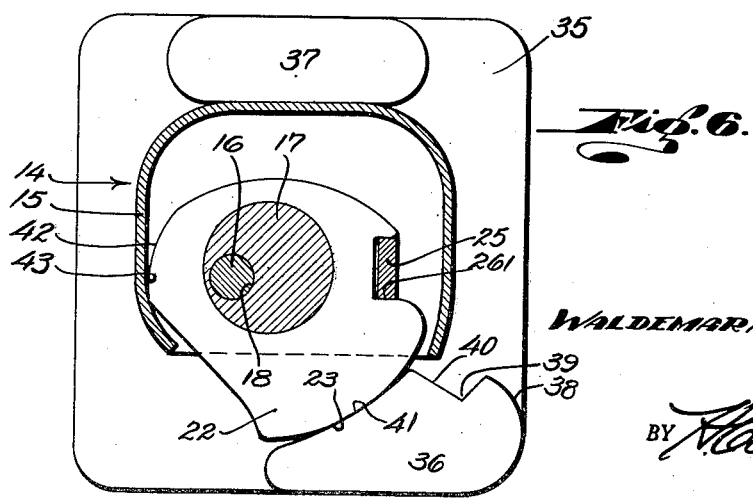
WALDEMAR A. ENDTER
INVENTOR.
BY
ATTORNEY Sept. 25, 1951      W. A. ENDTER      2,569,042
LOCK CONTROL MECHANISM
Filed Jan. 12, 1946      3 Sheets-Sheet 3
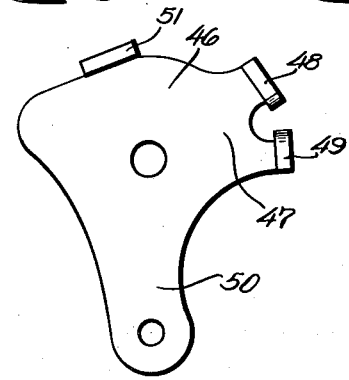
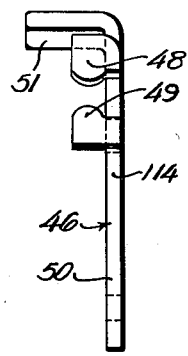
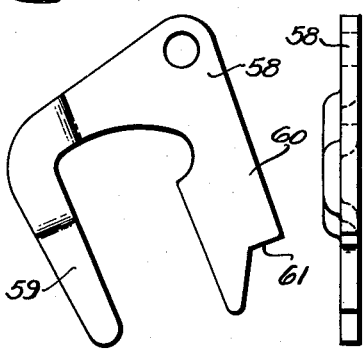
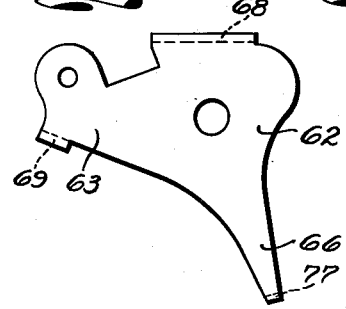
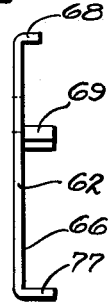
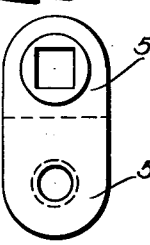
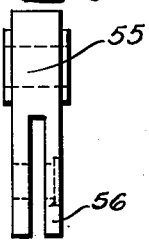
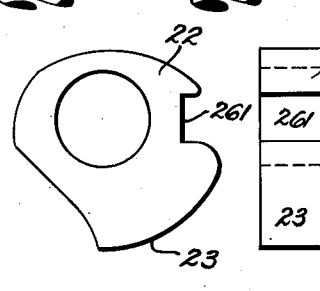
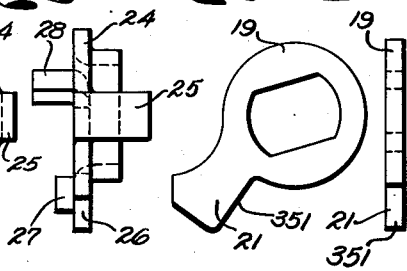
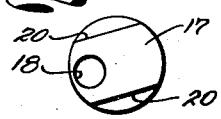
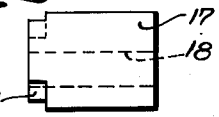
WALDEMAR A. ENDTER
INVENTOR.
BY
ATTORNEY

Patented Sept. 25, 1951

2,569,042

UNITED STATES PATENT OFFICE 2,569,042

LOCK CONTROL MECHANISM

Waldemar A. Endter, Long Beach, Calif.

Application January 12, 1946, Serial No. 640,860

1 Claim. (Cl. 292—223)

This invention has to do generally with latching and locking devices of the pivoted or swinging bolt type, and is directed particularly to improvements in mechanisms for controlling the locked condition of the latch from both the inside and outside of a movable closure with which the latch is associated. The invention is particularly adaptable to the latching and locking of vehicle closures, and accordingly will be described typically as embodied in a type and form appropriate for automobile doors.

Broadly considered, the invention is applicable to various specific forms of pivoted or swinging bolt latches where operation (retraction) of the bolt is effected by a swinging or pivotally movable member, as specifically a part or extension of the bolt itself. As illustrative, the invention is shown and will be described as applied to the type of bolt and latch proper constituting the subject matter of my copending application Serial Number 640,859, filed on even date herewith, entitled Latch.

Functionally the invention contemplates effecting control of the locked condition of the latch parts, at both the inside and outside of the door and by combinations of inside and outside operators, i. e. push button and handle, and a key actuated mechanism. Generally speaking, among my purposes are to control the pivoted, or pivotally and bodily movable bolt, by an actuating mechanism capable also of locking the latch assembly against bolt release under and by the following conditions and operations: (1) With the door in closed position, its latch may be locked at the inside of the door by actuation of the push button or equivalent control, or the catch may be key-locked at the outside of the door, the effect of the locking in either instance being to render the outside operator or handle ineffective but freely rotatable or otherwise movable, and preferably to positively lock the inside handle against opening movement. (2) With the door in open position, the latch may be locked by first actuating the push button control and then closing the bolt into its keeper while maintaining the outside operator in open or bolt releasing position. In this connection it may be mentioned that should the door be closed without so maintaining the outside operator, the effect of the bolt displacement by the keeper will be to restore the parts to their normal condition as existed before actuation of the push button control.

Structurally the invention contemplates various features of improvement in the mounting, arrangement and operative relation of the lock and bolt control parts. Particularly the invention aims to utilize a combination of a minimum number of rotative control parts, i. e. the later described actuating lever, control lever and cooperating elements, so associated with the rotating bolt as to be capable of all the aforesaid functions and yet involve only simple manufacturing and assembly requirements.

The various objects and details of the invention will be understood more fully and to best advantage from the following detailed description of the typical embodiment shown by the accompanying drawings, in which:

Fig. 1 is a view, partly in section, showing the normal position of the bolt and lock control parts within one side of the case, the view being taken on line 1—1 of Fig. 2;

Fig. 2 is a section on line 2—2 of Fig. 1 with a portion of the deck broken away to expose the end parts of the bolt and eccentric assembly;

Fig. 3 is a fragmentary section on line 3—3 of Fig. 1;

Figs. 4 and 5 are views similar to Fig. 1 showing the control parts in different operating positions;

Fig. 6 is a section on line 6—6 of Fig. 5 illustrating the latch and keeper association;

Figs. 7 and 8 are side and edge views of the bolt actuating lever;

Figs. 9 and 10 are side and edge views of the outside operator actuated element;

Figs. 11 and 12 are side and edge views of the control lever;

Figs. 13 and 14 are side and edge views of the link interconnecting the outside operator with the element of Fig. 9;

Figs. 15 and 16 are side and edge views of the bolt proper;

Figs. 17 and 18 are side and edge views of the operating connection with the bolt;

Figs. 19 and 20 are side and edge views of the eccentric-carried arm; and

Figs. 21 and 22 are end and side views of the eccentric shaft.

Referring first to Figs. 1 and 2, the latch assembly is carried by the usual angular case 10, one flange 11 of which supports the manually operated latch control mechanism generally indicated at 12, the other case flange 13 supporting the bolt and eccentric shaft assembly generally indicated at 14. The angular case is adapted to be fitted to the usual vehicle or automobile door, with the bolt assembly 14 at the door edge, all in a manner understood by those familiar with the art.

The assembly 14 comprises the hollow bracket or semi-housing 15 attached at 16I to the case flange 13 in spaced relation to a stationary deck member 171. The housing and deck support a pin or center shaft 16 which carries the rotating eccentric shaft 17, see Figs. 21 and 22, having the axially offset pin-receiving bore 18. The eccentric shaft carries a ring 19, see Figs. 19 and 20, fitted to the flattened surfaces 20 on the eccentric or otherwise associated therewith so that spring pressure exerted against the arm extension 21 of the ring tends to rotate the shaft.

Shaft 17 carries the relatively rotatable bolt 22, see Figs. 15 and 16, having the curved keeper-engaging face 23. The second bolt part 24 shown in Figs. 17 and 18, and preferably made as a separate but interfitting piece for convenience of manufacture and assembly, comprises a lug 25 received within the bolt notch 261 so that the parts are interlocked for rotation together. The part 24 has an arm portion 26 carrying a stop lug 27 engageable against the case flange 11 to arrest the bolt rotation in a latching direction, the arm carrying a second lug 28, purposes of which will later appear.

In the assembly views of Figs. 1, 4 and 5, it will be observed that the bolt part 24 extends to the inside of the housing 15, with lug 28 projecting through the deck opening 29, see Fig. 2, for engagement by the later described actuating lever. Being bodily and rotatably movable on the eccentric shaft, the bolt has "floating" characteristics such that under the influence of spring thrusts exerted against the eccentric shaft and bolt, the latter has the capacity for independent rotation, as upon closing engagement against the keeper, whereas the eccentric and bolt assembly operates to exert opposing thrusts against the keeper and door, assuming the latter to carry the latch assembly. The bolt is yieldably restrained against anti-latching rotation by coil spring 32 suitably mounted at 33 on the case and bearing against surface 341 of the arm 26. The eccentric shaft 17 is urged in a direction tending to thrust the bolt against the keeper, by second coil spring 34 bearing against the surface 351 on arm 21 of the ring 19.

Referring to Fig. 6, the keeper plate 35, adapted to be applied to the door pillar, carries the keeper proper 36 and vertically spaced lug 37, between which the bolt and housing 15 are received in the latched condition of the parts with the bolt 22 in engagement with the keeper 36 and the housing 15 maintained by virtue of the bolt thrust in pressural engagement with the lug 37. Assuming the bolt and housing assembly, as viewed in Fig. 6, to be moved from right to left into the keeper, as when the door is swung from open to closed position, engagement of the bolt against the end 38 of the keeper rotates the bolt in an anti-latching direction against the resistance of spring 32 and simultaneously turns the eccentric 17 against the resistance of the spring 34 as a result of the engagement of arm 21 with lug 27. The bolt first snaps into the safety catch notch 39 in the keeper and subsequently rides over the surface 40 to engage the curved keeper face 41, along which the bolt is movable in accordance with the limit of relative closing movement or take-up, between the door and its pillar. Spring 34 tends constantly to rotate the eccentric 17 in a direction thrusting the bolt against the stationary keeper, and hence tending to crowd the door, as against the usual cushion, toward fully closed position.

Referring again to Fig. 6, the bolt is supported against the keeper reaction by engagement of the bolt surface 42 with the inside surface 43 of the housing 15. In the unlatched condition of the bolt, surfaces 42 and 43 need not necessarily be interengaged, but as the bolt enters the keeper, the bolt is thrust against the stationary abutment presented by the housing surface 43, against which the bolt is engaged and along which its surface 42 is movable in the latched conditions of the bolt. The support thus gives the bolt, and the interengagement of surfaces 42 and 43 during their relative movement, effectively resist retrograde displacement of the bolt from latched condition under such conditions as combined pressure and vibration exerted against the inside of the door.

Further details concerning the operation of the bolt and eccentric latch assembly are more fully developed in my co-pending application Serial No. 597,097, which is directly concerned with those features of the mechanism.

Referring now to the control mechanism 12, the case flange 11 carries a pin 45 on which is pivoted a bolt actuating bell crank lever 46, see Figs. 7 and 8, having a bifuracted arm 47 carrying spaced lugs 43 and 48 between which is received lug 28 on the bolt control part 24, so that in effect the lever 46 and bolt 22 are interconnected for movement together in opposite directions. Lever 46 has a second arm 50 for connection, as later described, with the inside operator. The lever carries a lug 51 engaged by coil spring 52 on the pin 45, the spring serving primarily to take up looseness or lost motion between the parts, and functioning also to resist anti-latching rotation of the lever 46.

Spindle 53 journaled in the bracket 54, carries at its outer end the usual outside operator or handle (not shown), and carries inside the case the link or arm 55, see Figs. 13 and 14, which rotates with the spindle. The free bifurcated end 56 of the arm receives and is pivotally connected by pin 57 with bifurcated yoke element 58, see Figs. 9 and 10, the arms 59 and 60 of which are projectable downwardly and at opposite sides of the pin 45. The arm 60 has a shoulder 61 normally engageable against lug 48 so that upon opening turning of the outside operator, against the resistance of spring S engaging arm 55 to produce anti-latching rotation of the bolt, as to disengage the bolt from the keeper. As will appear, the element 58 is rotatable on pin 57 independently of the arm 55, to disengage or dissociate the arm 60 from the actuating lever lug 48, and to permit independent movements of the outside operator and directly associated parts.

At the inside of the actuating lever, pin 45 carries the control lever 62, see Figs. 11 and 12, which includes the lateral arm 63 pivotally connected to the usual push button rod 64 operable at the inside of the door, and a second arm 66 adapted to be engaged and actuated by key controlled locking device 67. Lever 62 has an upper lug 68 engageable against arm 59 of the element 58, and carries a second lug 69 on the bottom of the arm portion 63. As will be apparent, the control lever 62 normally assumes the positions shown in Figs. 1 and 4. Upon depression of the push button rod 64, the lever is swung to the position appearing in Fig. 5. Initial movements of the control lever in either direction are resisted by an "over center" coil spring 65 connected to the arm 66 and case flange 11.

Arm 50 of the actuating lever 46 has at 70 a pin and slot or other suitable lost motion connection with link 71 attached to the usual inside operator or door handle, the link being reciprocable in response to turning movements of the handle. The lost motion connection 70 permits rotation of the lever 46 independently of the link 71 (from the position of Fig. 4 to that of Fig. 5) as the bolt rotates upon entering the keeper, and provides a positive connection for retraction of the bolt, as from the position of Fig. 1, to release the bolt from the keeper. Link 71 carries an arm or hook 72 engageable with lug 69 on the control lever in the position of Fig. 5, to lock the link 71 against bolt retractive movement.

The key controlled lock 67 may include the usual key receiving tumbler assembly, not shown, which controls rotation of the spindle 73 extending through the housing bracket 74 and carrying the rotor 75. By virtue of the engageability of its projections 76 with the control lever arm lug 77, the rotor 75 functions in essentially the same manner as the push button rod 64, to permit or restrain rotation of the control lever 62, and to correspondingly control the operative condition of the rotation assembly.

In considering the operation of the invention, assume first the door to be closed, with the bolt having entered the keeper as in the position of Fig. 6 and with the control assembly 12 in the condition shown in Fig. 1. To disengage the latch and open the door from the outside, spindle 53 is turned to displace element 58 downwardly to the position of Fig. 4, arm 60 engaging and rotating the actuating lever 46 to release the bolt 22 from the keeper, as previously explained. To release the bolt and open the door from the inside, starting with the parts as in Fig. 1, movement to the left of link 71 turns lever 46 to rotate the bolt out of the keeper.

The door may be locked at the inside by pressing down the push button rod 64 to the position shown in Fig. 5, the control lever 62 thus being rotated to bring its lug 69 beneath the hooked end of arm 72 to prevent retraction of the link 71, and lug 68 simultaneously being engaged against arm 59 of the element 58 to swing the latter to the position of Fig. 5 in which shoulder 61 is operatively disassociated from the lug 48. Thus the mechanism becomes locked from the outside as well, in that turning of the outside operator and spindle 53 produces only idling or ineffective displacement of the yoke element 58, since the latter has been shifted out of the path of engagement with lug 48.

Assuming again the door to be closed and with the bolt and levers 46 and 62 to have the position shown in Fig. 1, the door may be key-locked at the outside by key rotation of the spindle 73, swinging the rotor 75 to turn the control lever 62 to the position of Fig. 5, during which movement lug 69 is brought into locked relation with the link arm 72 and the element 58 is shifted, by its engagement by lug 68, to a position of disengagement with lug 48.

Finally, assume the door to be in an open position and that it is to be closed with the latch brought into locked position by manipulation of the push button rod and outside operator. By first depressing the push button rod to the position of Fig. 5 and then turning the outside operator to throw the element 58 down to the dotted line position of Fig. 5, the lever 46 is conditioned for actuation by the bolt independently of any influence on either the inside or outside operators. Thus as lever 46 is rotated in response to rotation of the bolt as it enters the keeper, the lost motion connection at 70 permits rotation of the lever independently of movement of the link 71, and by virtue of its clearances from the arms 59 and 60, the lug 51 is permitted to swing within the upper recessed portion of element 58 (see the dotted line position of Fig. 5) without displacing the latter from the ineffective position to which it has been shifted by the control lever 62. Thus after the bolt enters the keeper, it remains in a locked condition by reason of the continued ineffectiveness of the element 58 to engage and rotate the lever 46 until such time as the element may be restored to operative position by key rotation of the control lever 62.

If the door is closed from open position with the parts as in Fig. 5, and without turning the outside handle, the bolt engagement against the keeper and the resulting rotation of the actuating lever 46, restore the control lever 62 and push button rod 64 to their former positions of Fig. 1. Rotation of lever 46 brings lug 51 against arm 60 to swing the element 58 a distance sufficient to rotate lever 62 (by engagement of arm 59 against lug 68) to its over-center position with relation to spring 65. Lug 68 then engaging arm 60, swings element 58 to the position of Fig. 1 as lever 62 ultimately reaches its corresponding position.

I claim:

In a latching mechanism applicable to a door and having a releasable holding part latchably engageable with a part on the door frame, operating mechanism for the holding part comprising: an oscillatably mounted actuating member adapted to be operatively connected to the holding part for effecting releasing movement thereof; an operating lever mounted for pivotal movement by an outside operator; a bifurcated connector pivotally connected to said lever for movement between a position of operative engagement of one of the connector legs with said actuating member and a position of disengagement of said leg therewith, said connector being reciprocable by said operating lever to effect releasing movement of said actuating member when said leg is in operative engagement therewith; a control element mounted for pivotal movement about the axis of oscillation of said actuating member and having an arm straddled by said connector legs to shiftably pivot the connector between said positions by pivotal movements of said element; means for moving said control element to shift the connector; and an arm on said actuating member engageable with an abutment on one of said connector legs for shifting said connector from its disengaged position to its engaged position upon oscillation of said member by latching movements of the holding part, said abutment being movable out of the path of travel of said arm upon reciprocation of said connector by said operating lever.

WALDEMAR A. ENDTER.

REFERENCES CITED

The following references are of record in the file of this patent:

UNITED STATES PATENTS

| Number | Name | Date |
|---|---|---|
| 2,094,413 | Schonitzer | Sept. 28, 1937 |
| 2,231,075 | Lakin | Feb. 11, 1941 |
| 2,234,810 | Simpson | Mar. 11, 1941 |
| 2,246,782 | Dall | June 24, 1941 |
| 2,249,018 | Marple | July 15, 1941 |
| 2,272,167 | Cloutier | Feb. 10, 1942 |
| 2,299,353 | Simpson | Oct. 20, 1942 |